United States Patent [19]
Sato

[11] Patent Number: 5,502,341
[45] Date of Patent: Mar. 26, 1996

[54] ELECTRIC MOTOR AND METHOD OF PRODUCING THE SAME

[75] Inventor: Hironobu Sato, Ota, Japan

[73] Assignee: Sanyo Electric Co., Ltd., Osaka, Japan

[21] Appl. No.: 232,303

[22] Filed: Apr. 25, 1994

Related U.S. Application Data

[62] Division of Ser. No. 885,865, May 20, 1992, abandoned.

[30] Foreign Application Priority Data

May 20, 1991 [JP] Japan ..................... 3-114838

[51] Int. Cl.⁶ .................... H02K 15/02; H02K 15/10; H02K 1/04; H02K 1/16
[52] U.S. Cl. ............... 310/42; 310/43; 310/254; 29/596
[58] Field of Search ............... 310/42, 43, 254; 29/596; 264/272.19, 272.2

[56] References Cited

U.S. PATENT DOCUMENTS

| | | | |
|---|---|---|---|
| 2,423,345 | 7/1947 | Roters | 310/162 |
| 2,607,816 | 8/1952 | Ryder et al. | 310/42 |
| 2,695,969 | 11/1954 | Yates | 310/259 |
| 2,711,008 | 6/1955 | Smith | 310/216 |
| 3,206,629 | 9/1965 | Jensen | 310/162 |
| 3,492,516 | 1/1970 | Fujiwara et al. | 310/67 |
| 3,827,141 | 8/1974 | Hallerback | 310/43 |
| 3,912,955 | 10/1975 | Simpson | 310/42 |
| 3,914,859 | 10/1975 | Pierson | 310/42 |
| 4,149,309 | 4/1979 | Mitsui | 310/42 |
| 4,912,353 | 3/1990 | Kondo et al. | 310/42 |
| 5,097,168 | 3/1992 | Takekoshi et al. | 310/43 |
| 5,134,327 | 7/1992 | Sumi et al. | 310/42 |

FOREIGN PATENT DOCUMENTS

| | | | |
|---|---|---|---|
| 0002038 | 1/1985 | Japan | 310/216 |
| 60-156231 | 9/1985 | Japan | 310/254 |
| 1-248948 | 10/1989 | Japan | 310/254 |

Primary Examiner—Clayton E. LaBalle
Attorney, Agent, or Firm—Wenderoth, Lind & Ponack

[57] ABSTRACT

A stator according to the present invention comprises a circular nonmagnetic material having a bore into which a rotor is rotatably inserted, a plurality of teeth radially fitted to the material at equal intervals, stator wires wound around the teeth, and a yoke fitted to the outer peripheries of these teeth in such a way as to link the adjoining teeth.

4 Claims, 5 Drawing Sheets

ELECTRIC MOTOR AND METHOD OF PRODUCING THE SAME

This application is a Divisional of now abandoned application, Ser. No. 07/885,865, filed May 20, 1992.

BACKGROUND OF THE INVENTION

The present invention relates to an electric motor, and more particularly to a stator for a small-sized electric motor, and provides an improved stator and a method of producing the stator.

A conventional stator for use in an electric motor of a small size is disclosed in Japanese Patent Publication No. 52-79207 (unexamined), published Jul. 4, 1977. The conventional stator is produced by the steps of placing core plates having a ring-shaped link unit around a central bore for rotatably receiving a rotor and teeth interlinked with the link unit, laying the core plates to form a stator core, winding stator wires on the teeth from an outer periphery of the stator core, and forcing the stator core into a ring core.

In the conventional stator of the Japanese publication, the ring-shaped link unit is used to hold the teeth in position, so that the link unit can prevent the teeth from being separated from the link unit. Thus, the efficiency of assembling the stator is improved at the same time.

One of the problems inherent in the conventional stator resides in a leakage of magnetic flux. In other words, since the ring-shaped link unit and the teeth are unitarily press-formed of the same material, the magnetic flux produced in the teeth tends to leak through the ring-shaped link unit, and the ring shaped link unit develops into a magnetic "bridge", and thus the operational efficiency of the motor is lowered.

SUMMARY OF THE INVENTION

An object of the present invention is to provide an improved motor which can prevent the magnetic flux from leaking out of the teeth of the stator.

Another object of the present invention is to provide a new stator in which openings of the teeth of the stator core toward the rotor can be shielded with a nonmagnetic insulating resin so that leakage of the magnetic flux can be prevented.

In the present invention, an electric motor has a rotor and a stator having a bore for rotatably receiving the rotor. The rotor has a non-magnetic mold member which forms the bore inside thereof. A plurality of teeth are fitted to an outer circumference of the non-magnetic mold member at a constant circumferential interval, and a plurality of slots are formed between the adjoining teeth. Stator wires are inserted into the slots and an annular yoke is forcibly fitted to an outer circumferential portion of the teeth so that a magnetic path is formed between the adjoining teeth.

In the method of the present invention, a stator core having slots and teeth is formed so that the slots are interlinked with a bore of a stator. The stator core is molded with synthetic resin so that openings of the slots are closed with the synthetic resin and the teeth are held by the synthetic resin. Notches are formed on an outer circumference of the stator core so that the notches are extended to the slots, and stator wires are inserted into the slots. An annular yoke is fitted over the outer circumference of the stator core so that the annular yoke closes the notches. Thus, a magnetic path can be formed between the adjoining teeth.

According to a preferred embodiment of the present invention, there is provided an electric motor comprising a rotor, and a stator having a bore for rotatably receiving the rotor. The stator comprises a non-magnetic mold member, the non-magnetic mold member forming the bore inside thereof. A plurality of teeth are fitted, at a constant circumferential interval, to an outer circumference of the non-magnetic mold member to thereby form a plurality of slots between adjoining teeth of the plurality of teeth. Stator wires are inserted into the slots, and an annular yoke is forcibly fitted to an outer circumferential portion of the teeth to form a magnetic path between adjoining teeth.

Further, in a preferred embodiment of the invention, there is provided a method of producing an electric motor with a rotor and a stator having a bore for rotatably receiving the rotor. A non-magnetic mold member has the bore inside thereof, a plurality of teeth are fixed to an outer circumference of the non-magnetic mold member at a constant circumferential interval to form slots between the adjoining teeth, stator wires are inserted into the slots, and an annular yoke is forcibly fitted to an outer peripheral portion of the teeth to form a magnetic path between the adjoining teeth. The method comprises the steps of forming the stator core having the slots and the teeth, the slots being interlinked with the bore through an opening, molding the stator core integrally with synthetic resin, the synthetic resin overlying upper faces and lower faces of the stator core and inner surfaces of the slots, the synthetic resin forming the non-magnetic mold member, the non-magnetic member closing the openings and contacting an end of the teeth at the side of the bore, forming notches on an outer periphery of the stator core molded by the synthetic resin so that the notches are extended to the slots, winding stator wires so that the store wires are wound in the slots through the notches from an outer circumference of the stator core molded with the synthetic resin, and fitting an annular yoke over the outer periphery of the stator core so that the annular yoke closes the notches after the stator wires are wound in the slots.

PREFERRED EMBODIMENT OF THE INVENTION

Figure 1:
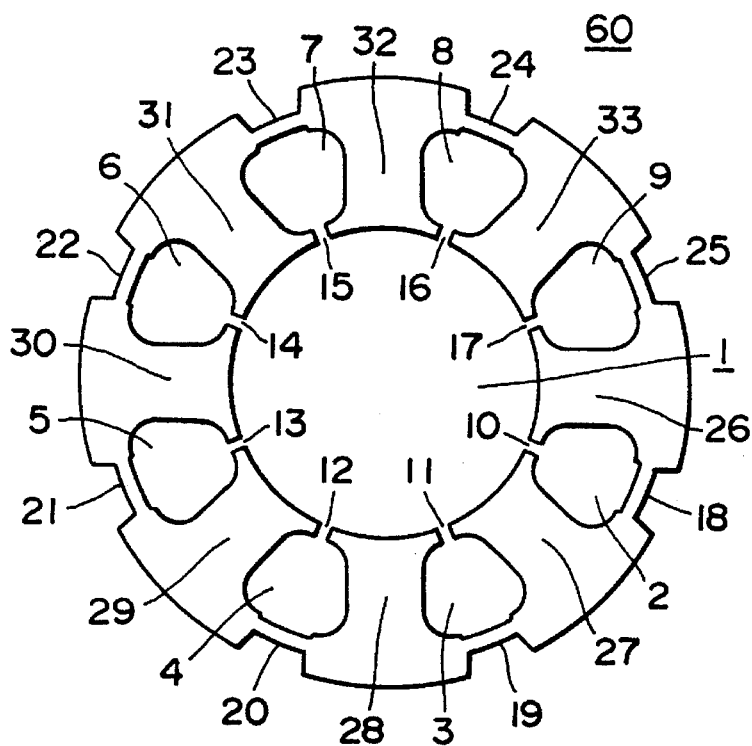
FIG. 1 is a top plan view of an iron core for a stator according to an embodiment of the present invention.

Referring first to FIG. 1, a stator core 60 is formed of a plurality of laminated core plates. Each core plate is prepared by punching an electrical steel plate having a thickness of about 0.5 mm. The stator core 60 has a bore 1 for rotatably receiving a rotor (not shown) and slots 2–9 at predetermined circumferential intervals to form teeth 26–33 between the adjacent slots 2–9. The slots 2–9 have openings 10–17 at an inner circumference of the stator core 60 so that the openings 10–17 are connected to the bore 1. The openings 10–17 serve as air gaps between the adjacent teeth 26–33. As the air gaps need only be wide enough for a satisfactory pole separation between the adjacent teeth, the width of the stator core 60 is minimized for improving the efficiency of the motor.

The stator core 60 has connection portions 18–25 on the outer circumferential portion to couple the adjacent teeth 26–33. Thus, the slots 2–9 are formed by the adjacent teeth 26–33 and the connection portions 18–25.

Figure 2:
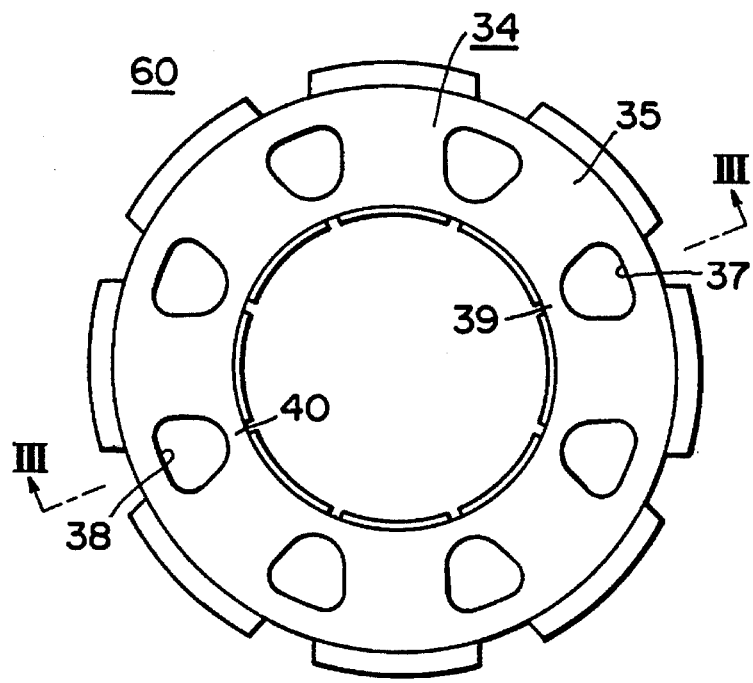
FIG. 2 is a top plan view of the stator core of FIG. 1 after it is molded, showing slots at a circumferential interval.
Figure 3:
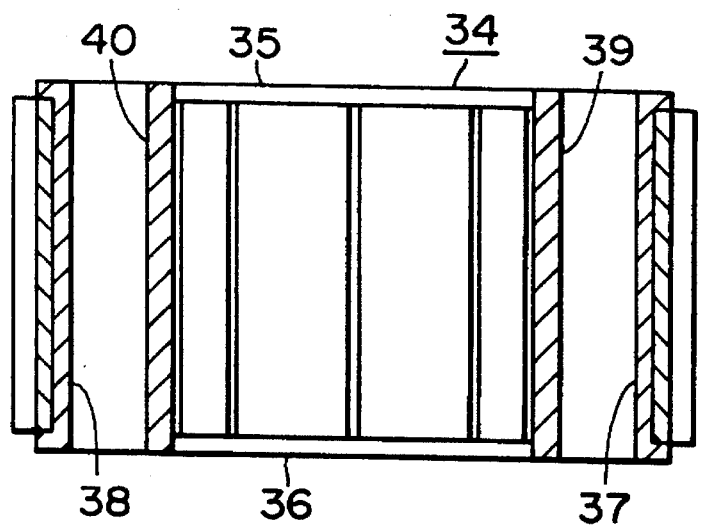
FIG. 3 is a sectional view taken along line III—III in FIG. 2.

After a plurality of core plates are placed in layers to form a stator core 60 by, for example, providing several teeth with caulkings to make the stator core tight, the upper and lower edge portions of the stator core 60, the inner peripheral faces of the slots 2–9 and the openings 10–17 are integrally molded with resin, so that a part of the teeth 26–33, adjacent to the bore 1, is solidly formed with the resin. Further, a cylindrical part of resin is formed with respect to the rotor bore 1 by inserting the resin into the openings 10–17 between the adjacent teeth 26–33. If necessary, core plates having interlinked openings may be placed in the stator core 60 to increase the mechanical strength of the stator core. With reference to FIGS. 2 and 3, the stator core 60 has an insulating portion 34 of a suitable resin such as polybutylene terephthalate, nylon with or without reinforcement of glass fiber. The insulating portion 34 is composed of an upper insulating portion 35 for insulating the upper edge of the stator core 60, a lower insulating portion 36 for insulating the lower edge of the stator core 60, slot-insulation portions 37 and 38 for insulating the slots 2–9, and portions, for example portions 39 and 40, for shielding the openings 10–17 of the slots. The portions 39 and 40 and the upper and lower insulating portions 35 and 56 are formed into a cylindrical shape at the side of the bore 1 so that the rotor bore 1 is surrounded by these portions.

Figure 4:
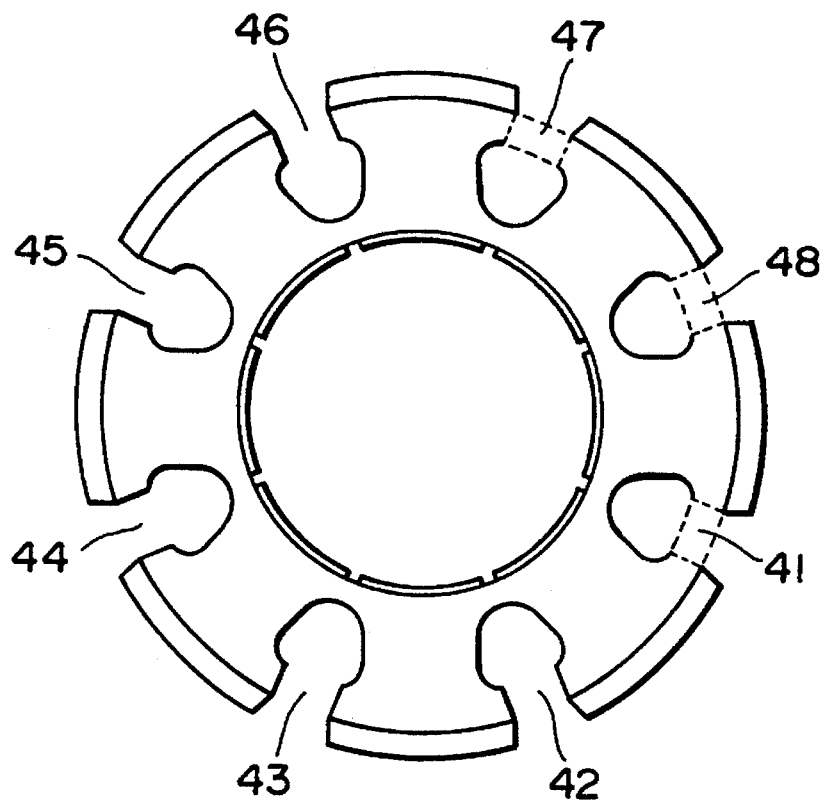
FIG. 4 is a top plan view of the stator core provided with notches extending from a circumference to the slots.

Then, as shown in FIG. 4, the connection portions 18–25 (FIG. 1) and the resin overlying the connection portions are cut out from the outer periphery of the stator core 60 shown in FIG. 2 to form notches 41–48. The connection portions 18–25 and the resin overlying the connection portions are cut out by a method of slitting the stator core by means of a cutter while turning the slots 2–9 pitch by pitch, or by a method of slot-to-slot punching of the stator core. If the processing is carried out in such a way as to evade portions where burrs may be produced, generation of burrs and the like on the stator core can be prevented.

Each of the teeth 26–33 is held by the portions, for example portions 39 and 40 for shielding the openings 10–17, the inner peripheral portion of the slots 2–9, and the resin formed on the upper and lower edge portions. Therefore, the teeth will not be dismembered or separated even if the connection portions 18–25 are cut off.

Figure 5:
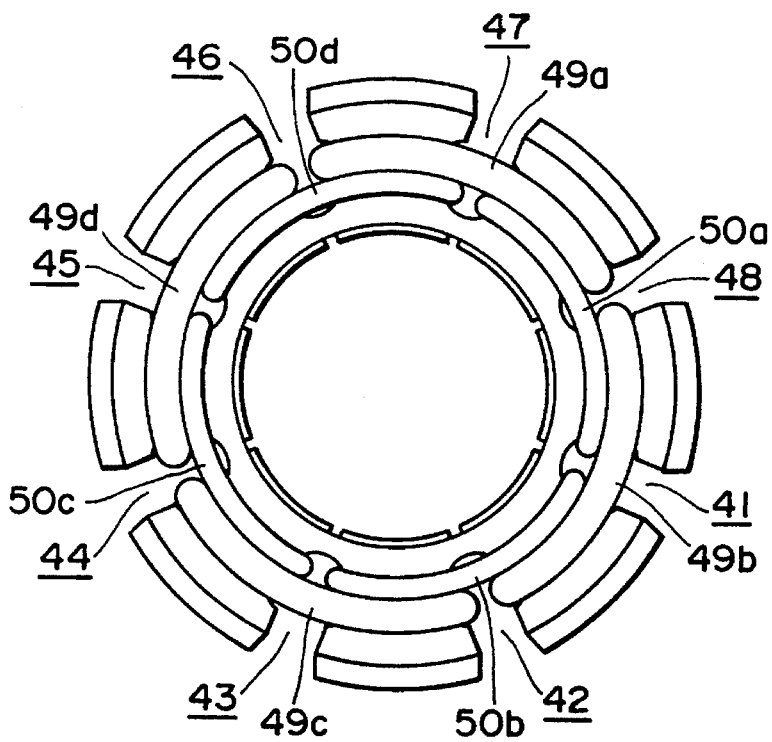
FIG. 5 is a top plan view of the stator core with stator windings.

In FIG. 5 showing an embodiment of the stator for a single-phase induction motor, the stator core 60 has main windings 49*a*–49*d* and subsidiary windings 50*a*–50*d*. These windings are directly wound on the respective teeth by a suitable high-speed winding machine (not shown) while attaching winding guides (not shown) are set to the notches 41–48 after the stator core is held in position. Therefore, the breadth of the notches 41–48 can be made smaller if the breadth is large enough for operation of the winding machine. If necessary, terminal pins can be used so that leading and trailing ends of each winding can automatically be tied up onto the terminal pins, and thus the winding operation can readily be automated.

Figure 6:
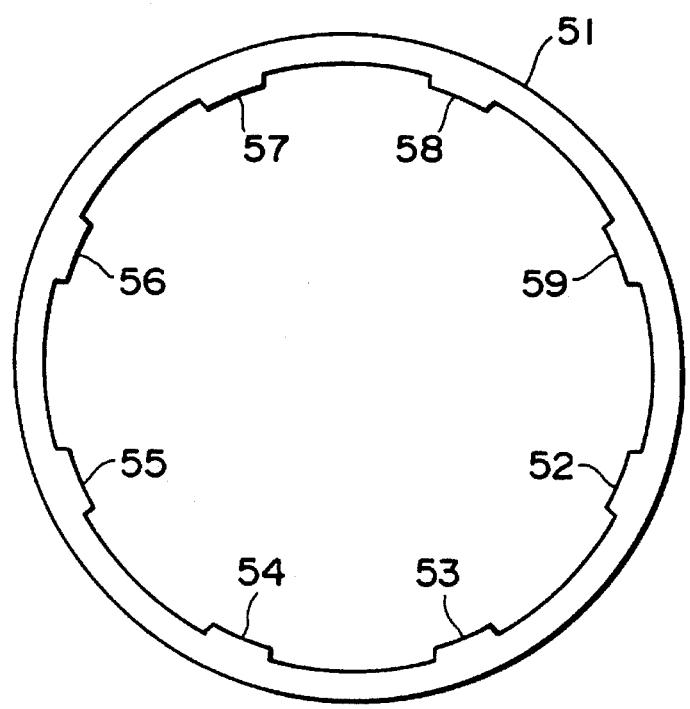
FIG. 6 is a top plan view of a yoke fittable to the circumference of the stator core shown in FIG. 5.

In FIG. 6, a cylindrical yoke 51 is forcibly fitted to an outer circumference of the stator core 60 shown in FIG. 5. The yoke 51 has a plurality of projections 52–59 projecting radially inwardly toward a center of the yoke so that the projections 52–59 can shield the respective notches 41–48. The yoke 51 is prepared by punching electric steel plates of the same material as that of the stator core 60 and placing them in layers for lamination. The laminated stator core is caulked by means of caulkings which are provided in positions where magnetic resistance is low. If necessary, some ends of the projections 52–59 can be formed unitarily by welding.

Figure 7:
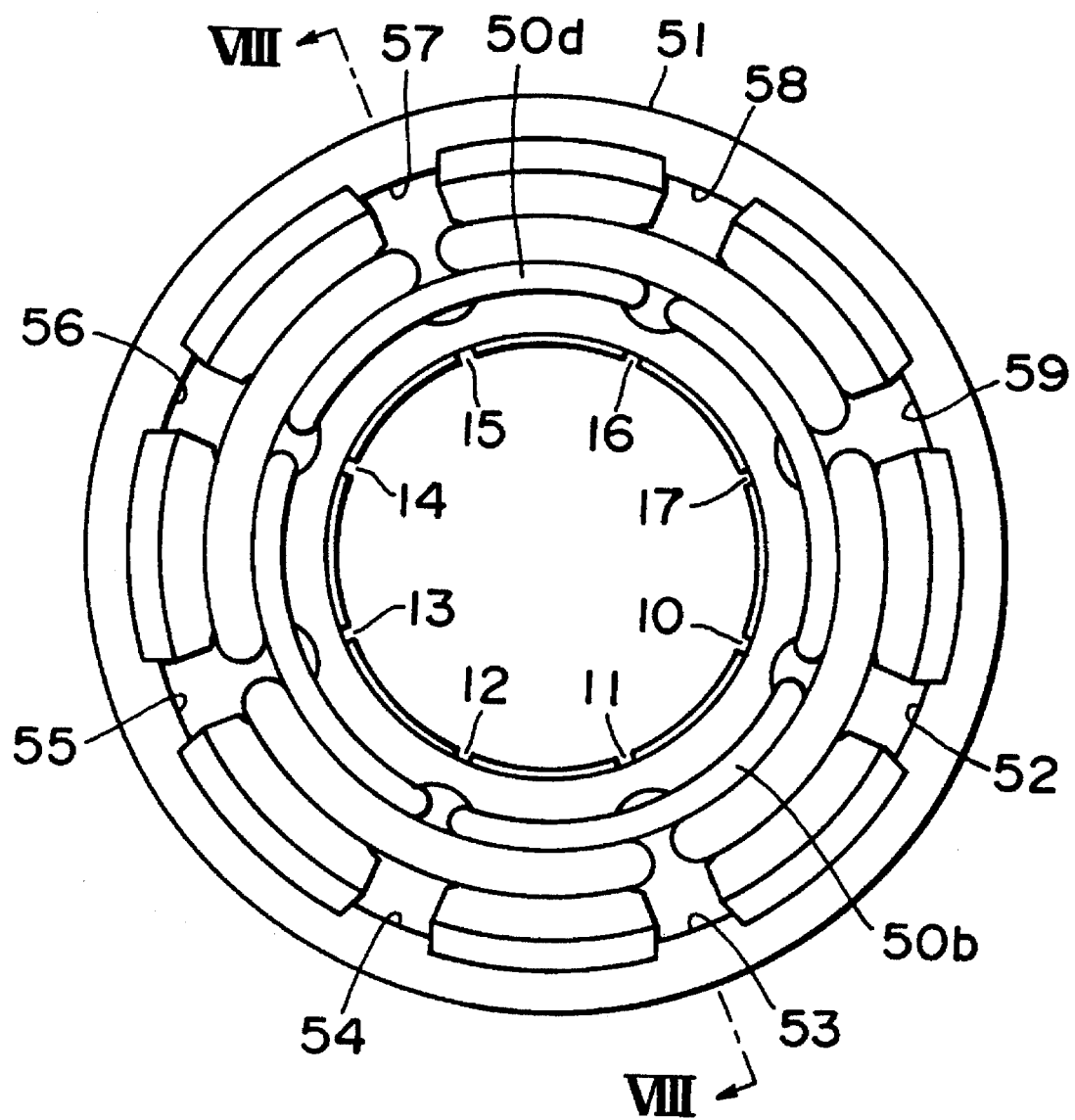
FIG. 7 is a top plan view of the stator core with the yoke fitted thereto.

In FIG. 7, showing the stator with the yoke press-fitted to the outer periphery of the stator core shown in FIG. 5, the yoke 51 holds the ends of the teeth 26–33 in the area between the projections 52–59 to place the respective teeth in position.

A guide pin (not shown), together with the insulation portions, may be formed integrally on the edge face on the bore side of the teeth when the stator winding is wound in such a way that the winding does not shield in any way the rotor bore. This structure enables the coil end to be shaped simply after the rotor winding is wound.

Figure 8:
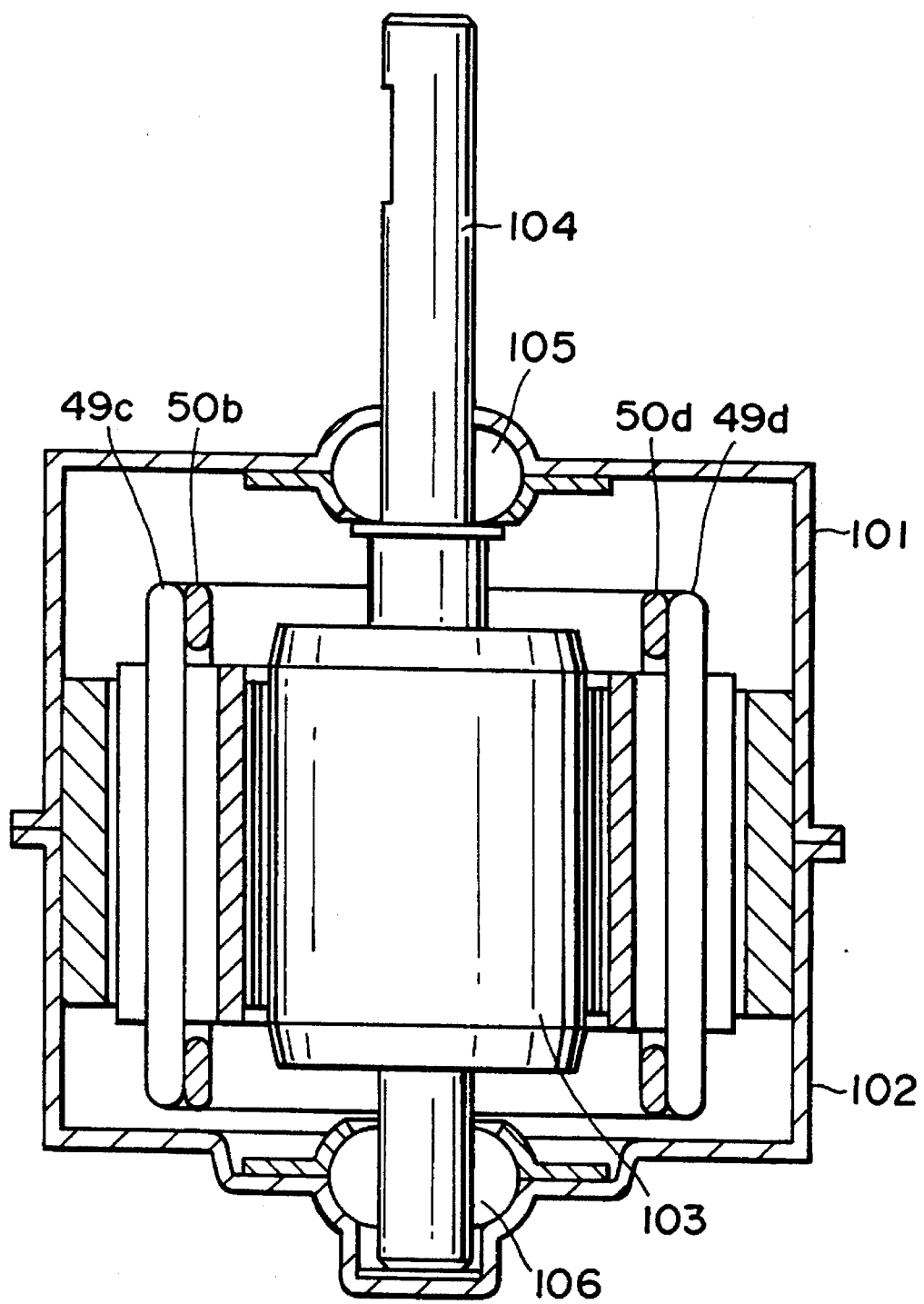
FIG. 8 is a sectional view of an electric motor incorporating the rotor according to the present invention, taken along line VIII—VIII in FIG. 7.

In FIG. 8, the stator 60 is fitted into brackets 101 and 102 composed of two parts, as shown, and provided with a rotor 103. The rotor 103 has a rotary shaft 104 rotatably supported on bearing metals 105 and 106.

According to the present invention, the stator of a motor comprises the circular nonmagnetic material having the bore into which the rotor is inserted, the plurality of teeth radially fitted to the nonmagnetic material at equal intervals, the stator wires wound around the teeth, and the yoke fitted to the outer peripheries of these teeth in such a way as to link the adjoining teeth. Therefore, the yoke can be fitted after the stator, wires are wound on the respective teeth from the outer periphery of the stator and this makes it unnecessary to wind the stator wires through the openings formed between the teeth on the rotor bore side. The breadth of the opening can thus be reduced to the extent that no magnetic bridging is produced with the effect of improving the operational efficiency of the motor. In the case of a motor having smaller openings, further, clogging is reduced so that noise derived from the vibration of the motor can be minimized.

The process of producing the stator according to the present invention comprises the steps of forming the stator core by placing the plurality of stator plates in layers, each stator plate having a plurality of slots arranged concentrically with each slot opened unidirectionally toward the rotary shaft of the rotor, shielding with nonmagnetic insulating resin the inner faces of the slots of the stator core, and faces of the stator core and the openings of the slots, subsequently forming a notch communicating with each slot from the outer periphery of the stator core, inserting the stator into the slots via the notches, and fitting the yoke over the outer periphery of the stator core. Therefore, the stator wires can be wound directly from the outer periphery of the stator core, and this makes possible high-speed winding for the stator wires, since a winder is not restricted, as compared with a case where the stator wires are directly wound from the inside on the rotor bore side.

As the opening between the teeth is shielded with the nonmagnetic material, the opening is free from magnetic bridging even though its breadth is decreased, and the reduced magnetic flux leakage contributes to improving the operational characteristics of the motor.

Moreover, the teeth are prevented from being dismembered and the integrated combination of the teeth can always be asesembled into the stator. Workability in assembling the stator is thus improved.

What is claimed is:

1. A method of producing a stator for an electric motor comprising the steps of:

forming a stator core having a plurality of teeth at a constant circumferential interval having an outer periphery that is annularly connected, a bore defined by the teeth, and slots between adjoining teeth such that the slots communicate with the bore through a plurality of openings separating the adjoining teeth;

molding the stator core integrally with synthetic resin such that the synthetic resin overlies upper faces and lower faces of the stator core and inner surfaces of the slots, the synthetic resin forming a non-magnetic mold member that closes the plurality of openings and has the bore inside thereof;

forming notches in said outer periphery of said stator core molded with the synthetic resin so that the slots are radially outwardly open;

winding stator wires in the slots through the notches from the outer circumference of the stator core molded with the synthetic resin; and forcibly fitting an annular yoke over the outer periphery of the stator core so that the annular yoke closes the notches after the stator wires are wound in the slots, thereby forming a magnetic path between the adjoining teeth;

wherein said step of forming notches comprises removing portions of the outer periphery of the stator core and the non-magnetic mold member that are radially outward of the slots.

2. A method of producing a stator for an electric motor comprising the steps of:

forming a stator core having a plurality of teeth at a constant circumferential interval having an outer periphery that is annularly connected, a bore defined by the teeth, and slots between adjoining teeth such that the slots communicate with the bore through a plurality of openings separating the adjoining teeth;

molding the stator core integrally with synthetic resin such that the synthetic resin overlies upper faces and lower faces of the stator core and inner surfaces of the slots, the synthetic resin forming a non-magnetic mold member that closes the plurality of openings and has the bore inside thereof;

forming notches in said outer periphery of said stator core molded with the synthetic resin so that the slots are radially outwardly open;

winding stator wires in the slots through the notches from the outer circumference of the stator core molded with the synthetic resin; and forcibly fitting an annular yoke over the outer periphery of the stator core so that the annular yoke closes the notches after the stator wires are wound in the slots, thereby forming a magnetic path between the adjoining teeth;

wherein said step of forming notches comprises cutting portions of the outer periphery of the stator core and the non-magnetic mold member that are radially outward of the slots.

3. A method of producing an electric motor comprising the steps of:

forming a stator core having a plurality of teeth at a constant circumferential interval having an outer periphery that is annularly connected, a bore defined by the teeth, and slots between adjoining teeth such that the slots communicate with the bore through a plurality of openings separating the adjoining teeth;

molding the stator core integrally with synthetic resin such that the synthetic resin overlies upper faces and lower faces of the stator core and inner surfaces of the slots, the synthetic resin forming a non-magnetic mold member that closes the plurality of openings and has the bore inside thereof;

forming notches in the outer periphery of the stator core molded with the synthetic resin so that the slots are radially outwardly open;

winding stator wires in the slots through the notches from the outer circumference of said stator core molded with the synthetic resin;

forcibly fitting an annular yoke over the outer periphery of the stator core so that the annular yoke closes the notches after the stator wires are wound in the slots, thereby forming a magnetic path between the adjoining teeth; and disposing a rotor in the bore so as to be rotatable therein;

wherein said step of forming notches comprises removing portions of the outer periphery of the stator core and the non-magnetic mold member that are radially outward of the slots.

4. A method of producing an electric motor comprising the steps of:

forming a stator core having a plurality of teeth at a constant circumferential interval having an outer periphery that is annularly connected, a bore defined by the teeth, and slots between adjoining teeth such that the slots communicate with the bore through a plurality of openings separating the adjoining teeth;

molding the stator core integrally with synthetic resin such that the synthetic resin overlies upper faces and lower faces of the stator core and inner surfaces of the slots, the synthetic resin forming a non-magnetic mold member that closes the plurality of openings and has the bore inside thereof;

forming notches in the outer periphery of the stator core molded with the synthetic resin so that the slots are radially outwardly open;

winding stator wires in the slots through the notches from the outer circumference of said stator core molded with the synthetic resin;

forcibly fitting an annular yoke over the outer periphery of the stator core so that the annular yoke closes the notches after the stator wires are wound in the slots, thereby forming a magnetic path between the adjoining teeth; and disposing a rotor in the bore so as to be rotatable therein;

wherein said step of forming notches comprises cutting portions of the outer periphery of the stator core and the non-magnetic mold member that are radially outward of the slots.

* * * * *